(12) United States Patent
Jiang (10) Patent No.: US 7,917,139 B2
(45) Date of Patent: *Mar. 29, 2011

(54) INBOUND ROAMER CALL CONTROL SYSTEM

(75) Inventor: John Yue Jun Jiang, Danville, CA (US)

(73) Assignee: Roamware, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/644,859

(22) Filed: Dec. 22, 2009

(65) Prior Publication Data

US 2010/0124923 A1    May 20, 2010

Related U.S. Application Data

(63) Continuation of application No. 11/366,021, filed on Mar. 2, 2006, now Pat. No. 7,660,580.

(60) Provisional application No. 60/658,258, filed on Mar. 2, 2005.

(51) Int. Cl.
    *H04W 4/00*    (2009.01)
(52) U.S. Cl. ............... 455/432.1; 455/433; 455/435.2; 455/439; 455/442; 455/443
(58) Field of Classification Search .......... 455/432.1, 455/433, 435.2
    See application file for complete search history.

(56) References Cited

U.S. PATENT DOCUMENTS

| | | | |
|---|---|---|---|
| 5,353,328 A | 10/1994 | Jokimies | |
| 5,586,166 A | 12/1996 | Turban | |
| 5,742,910 A | 4/1998 | Gallant et al. | |
| 5,818,824 A | 10/1998 | Lu et al. | |
| 5,854,982 A | 12/1998 | Chambers et al. | |
| 5,901,359 A | 5/1999 | Malmstrom | |
| 5,903,832 A | 5/1999 | Seppanen et al. | |
| 5,930,701 A | 7/1999 | Skog | |
| 5,940,490 A | 8/1999 | Foster et al. | |
| 5,943,620 A | 8/1999 | Boltz et al. | |
| 5,987,318 A | 11/1999 | Alperovich et al. | |

(Continued)

FOREIGN PATENT DOCUMENTS

CA    2281041 A1    2/2001

(Continued)

OTHER PUBLICATIONS

Digital cellular telecommunications system (Phase 2+); Specification of the SIM Application Toolkit for the Subscriber Identity Module-Mobile Equipment (SIM-ME) Interface (GSM 11,14 version 8.3.0 Release 1999) STSI TS 101 267 V8.3.0, XX, XX, Aug. 2000, pp. 1-69 and pp. 114-115 (XP-002222021).

(Continued)

*Primary Examiner* — David Q Nguyen
(74) *Attorney, Agent, or Firm* — Arent Fox LLP (57) ABSTRACT

A system for implementing call control services for an inbound roamer is provided. The system includes a control node to implement the call control services in response to an initiation request. The system further includes a service node to send a terminating customized applications for mobile network enhanced logic subscription information (T-CSI) for a called number in response to a routing request for the called number. The T-CSI contains an address pointing to the control node. The system further includes a switching center to send the routing request for the called number. The called number is present in a call received from the inbound roamer.

26 Claims, 7 Drawing Sheets

U.S. PATENT DOCUMENTS

| | | | |
|---|---|---|---|
| 5,987,323 | A | 11/1999 | Huotori |
| 5,987,325 | A | 11/1999 | Tayloe |
| 6,014,561 | A | 1/2000 | Mölne |
| 6,052,604 | A | 4/2000 | Bishop |
| 6,058,309 | A | 5/2000 | Huang et al. |
| 6,075,855 | A | 6/2000 | Christiansen et al. |
| 6,085,084 | A | 7/2000 | Christmas |
| 6,138,005 | A | 10/2000 | Park |
| 6,138,009 | A | 10/2000 | Birgerson |
| 6,148,197 | A | 11/2000 | Bridges et al. |
| 6,163,701 | A | 12/2000 | Saleh et al. |
| 6,185,295 | B1 | 2/2001 | Frederiksen et al. |
| 6,185,436 | B1 | 2/2001 | Vu |
| 6,192,255 | B1 | 2/2001 | Lewis et al. |
| 6,195,532 | B1 | 2/2001 | Bamburak et al. |
| 6,208,864 | B1 | 3/2001 | Agrawal et al. |
| 6,356,756 | B1 | 3/2002 | Koster |
| 6,363,144 | B1 | 3/2002 | Becher et al. |
| 6,456,845 | B1 | 9/2002 | Drum et al. |
| 6,456,859 | B1 | 9/2002 | Desblancs et al. |
| 6,463,298 | B1 | 10/2002 | Sorenson et al. |
| 6,466,786 | B1 | 10/2002 | Wallenius |
| 6,505,050 | B1 | 1/2003 | Brudos et al. |
| 6,545,987 | B1* | 4/2003 | Becher .................. 370/328 |
| 6,574,481 | B1 | 6/2003 | Rathnasapathy et al. |
| 6,603,761 | B1 | 8/2003 | Wang et al. |
| 6,603,968 | B2 | 8/2003 | Anvekar et al. |
| 6,611,516 | B1 | 8/2003 | Pirkola et al. |
| 6,628,934 | B2 | 9/2003 | Rosenberg et al. |
| 6,671,523 | B1 | 12/2003 | Niepel et al. |
| 6,684,073 | B1 | 1/2004 | Joss et al. |
| 6,693,586 | B1 | 2/2004 | Walters et al. |
| 6,738,622 | B1 | 5/2004 | Stadelmann et al. |
| 6,738,636 | B2 | 5/2004 | Lielbridis |
| 6,764,003 | B1 | 7/2004 | Martschitsch et al. |
| 6,782,264 | B2 | 8/2004 | Anderson |
| 6,795,444 | B1 | 9/2004 | Vo et al. |
| 6,856,818 | B1 | 2/2005 | Ford |
| 6,876,860 | B1 | 4/2005 | Berg et al. |
| 6,920,487 | B2 | 7/2005 | Sofer et al. |
| 6,925,299 | B1 | 8/2005 | Sofer et al. |
| 6,961,559 | B1 | 11/2005 | Chow et al. |
| 6,963,543 | B2 | 11/2005 | Diep et al. |
| 6,968,383 | B1 | 11/2005 | Heutschi et al. |
| 6,975,852 | B1 | 12/2005 | Sofer et al. |
| 6,978,156 | B1 | 12/2005 | Papadopoulos et al. |
| 7,020,479 | B2 | 3/2006 | Martschitsch |
| 7,139,570 | B2 | 11/2006 | Elkarat et al. |
| 7,184,764 | B2 | 2/2007 | Raviv et al. |
| 7,231,431 | B2 | 6/2007 | Sofer et al. |
| 2002/0009199 | A1 | 1/2002 | Ala-Laurila et al. |
| 2002/0012351 | A1 | 1/2002 | Sofer et al. |
| 2002/0037708 | A1 | 3/2002 | McCann et al. |
| 2002/0049065 | A1 | 4/2002 | Wallenius |
| 2002/0087631 | A1 | 7/2002 | Sharma |
| 2002/0101858 | A1 | 8/2002 | Stuart et al. |
| 2002/0101859 | A1 | 8/2002 | Maclean |
| 2002/0118813 | A1* | 8/2002 | Brehm et al. .................. 379/229 |
| 2002/0160763 | A1 | 10/2002 | Mittal et al. |
| 2002/0187780 | A1 | 12/2002 | Souissi |
| 2002/0191575 | A1 | 12/2002 | Kalavade et al. |
| 2002/0196775 | A1 | 12/2002 | Tuohino et al. |
| 2003/0017843 | A1 | 1/2003 | Noblins |
| 2003/0050047 | A1 | 3/2003 | Ala-Luukko |
| 2003/0051041 | A1 | 3/2003 | Kalavade et al. |
| 2003/0064723 | A1 | 4/2003 | Thakker |
| 2003/0069922 | A1 | 4/2003 | Arunachalam |
| 2003/0129991 | A1 | 7/2003 | Allison et al. |
| 2003/0133421 | A1 | 7/2003 | Sundar et al. |
| 2003/0139180 | A1 | 7/2003 | McIntosh et al. |
| 2003/0208560 | A1 | 11/2003 | Inoue |
| 2003/0224795 | A1 | 12/2003 | Wilhoite et al. |
| 2003/0229791 | A1 | 12/2003 | De Jong |
| 2004/0053610 | A1 | 3/2004 | Kim |
| 2004/0087305 | A1 | 5/2004 | Jiang |
| 2004/0120552 | A1 | 6/2004 | Borngraber et al. |
| 2004/0131023 | A1 | 7/2004 | Auterinen |
| 2004/0132449 | A1 | 7/2004 | Kowarch |
| 2004/0196858 | A1 | 10/2004 | Tsai et al. |
| 2004/0229601 | A1 | 11/2004 | Zabawskyj et al. |
| 2004/0236836 | A1 | 11/2004 | Appleman |
| 2005/0021834 | A1 | 1/2005 | Coulombe |
| 2005/0047378 | A1 | 3/2005 | Wuschke et al. |
| 2005/0064883 | A1 | 3/2005 | Heck et al. |
| 2005/0186939 | A1 | 8/2005 | Barnea et al. |
| 2005/0186979 | A1 | 8/2005 | McCann et al. |
| 2005/0215250 | A1 | 9/2005 | Chava et al. |
| 2005/0232282 | A1 | 10/2005 | Silver et al. |
| 2005/0250493 | A1 | 11/2005 | Elkarat et al. |
| 2006/0003775 | A1 | 1/2006 | Bull et al. |
| 2006/0009204 | A1 | 1/2006 | Ophir |
| 2006/0025129 | A1 | 2/2006 | Wolfman et al. |
| 2006/0052113 | A1 | 3/2006 | Ophir et al. |
| 2006/0068778 | A1 | 3/2006 | Della-Torre |
| 2006/0068786 | A1 | 3/2006 | Florence |
| 2006/0079225 | A1 | 4/2006 | Wolfman et al. |
| 2006/0079236 | A1 | 4/2006 | Del Pino et al. |
| 2006/0148459 | A1 | 7/2006 | Wolfman et al. |
| 2006/0205404 | A1 | 9/2006 | Gonen et al. |
| 2006/0211420 | A1 | 9/2006 | Ophir et al. |
| 2007/0021118 | A1* | 1/2007 | Ophir .................. 455/432.1 |
| 2007/0049269 | A1 | 3/2007 | Ophir et al. |
| 2007/0054665 | A1 | 3/2007 | Elkarat et al. |
| 2007/0072587 | A1* | 3/2007 | Della-Torre .................. 455/410 |
| 2007/0178885 | A1 | 8/2007 | Lev et al. |

FOREIGN PATENT DOCUMENTS

| | | |
|---|---|---|
| EP | 0899 974 A2 | 3/1999 |
| GB | 2322998 | 9/1998 |
| WO | WO 98/12886 A1 | 3/1998 |
| WO | WO 98/26621 A2 | 6/1998 |
| WO | WO 98/26626 A2 | 6/1998 |
| WO | WO 98/53626 A1 | 11/1998 |
| WO | WO 00/18156 A1 | 3/2000 |
| WO | WO 00/51375 A | 8/2000 |
| WO | WO 00/79761 A | 12/2000 |
| WO | WO 00/79825 A | 12/2000 |
| WO | WO 01/22750 | 3/2001 |
| WO | WO 01/65884 | 9/2001 |
| WO | WO 02/019667 | 7/2002 |
| WO | WO 03/019960 A1 | 3/2003 |
| WO | WO 03/043367 A | 5/2003 |
| WO | WO 03/065660 A | 8/2003 |
| WO | WO 2004/081802 | 9/2004 |

OTHER PUBLICATIONS

"Digital Cellular Telecommunications system (Phase 2+); Universal Mobile Telecommunications system (UMTS); General Packet Radio Service (GPRS) Service description; Stage 2 (3GPP TS 23.060 Version 5.4.0 Release 5)" ETSI TS 123 060 V5.4.0, Dec. 2002, pp. 1-207 (XP-014007573).

"Digital Cellular Telecommunications system (Phase 2+); Universal Mobile Telecommunications system (UMTS); General Packet Radio Service (GPRS); GPRS Tunnelling Protocol (GTP) across the Gn and Gp Interface (3GPP TS 29.060 version 5.4.0 Release 5)" ETSI TS 129 060 V5.4.0, Dec. 2002, pp. 1-102 (XP-002298277).

Ala-Laurila, et al., "Wireless LAN Access Network Architecture for Mobile Operators," IEEE Communications Magazine, Nov. 2001, pp. 82-89 (XP-001107810).

Brunen, M. "Roaming im Zugangsnetz Mit OWLAN uberall zu Hause sein, "Net-Zeitschrift Fuer Kommunikationsmangement, Huthig Verlag, Heilderberg, 2002, pp. 39-42 (XP-001122438).

GSM Association Permanent Reference Document: IR.33, PRD IR.33 "GPRS Roaming Guidelines," version 3.2.0, Apr. 3, 2003, pp. 1-20 (XP-002298278).

Ostrowski, F., "Roaming und Handover zwischen UMTS und Funk-LA," NTZ (Nachrichtentechnische zeitschrift), 2002, pp. 24-26 (XP-001132263).

Telenor (origin GSMA), "Inter-PLMN Backbone Guidelines," S3z000005 3GPP TSG SA WG3 Security—S3#15bis, Ad-Hoc Meeting Nov. 8, 2000, pp. 1-30 (XP-002298276).

"Universal Mobile Telecommunications system (UMTS) NAS Functions Related to Mobile Station MS in Idle Mode" ETSI TS 123 122 V3.1.0, Jan. 2000, pp. 1-33.

"Digital Cellular Telecommunications System (Phase 2+) GSM; Univeral Mobile Telecommunications System (UMTS); Mobile Radio Interface Layer 3 Specification; Core Network Protocols, Stage 3" ETSI TS 124 008 V3.2.1, Jan. 2000, pp. 62-69 and 376.

Salman A. Baset et al., " an analysis of the Skype Peer-to-Peer Internet Telephony Protocol", Department of Computer Science, Sep. 15, 2004, 12 pages.

Salkintzis, et al., "WLAN-GPRS Integration for Next-Generation Mobile Data Networks," IEEE Wireless Communications, Oct. 2002, pp. 112-123 (XP-001132263).

Michael Mouly, "The GSM System for Mobile Communications", pp. 103-104. Cell and Sys, 1992.

GSM 378 on CAMEL Digital Cellular telecommunications system (Phase 2+);Customized Applications for Mobile network Enhanced Logic (CAMEL) Phase 2; Stage 2 (GSM 03.78 version 6.7.0 Release 1997).

GSM978 on CAMEL Application protocol Digital cellular telecommunications system (Phase 2+); Customized Applications for Mobile network Enhanced Logic (CAMEL); CAMEL Application Part (CAP) specification (GSM 09.78 version 7.1.0 Release 1998).

GSM 902 on MAP Specification Digital Cellular Telecommunications (Phase 2+); Mobile Application Part (MAP) Specification (3GPP TS 09.02 version 7.9.0 Release 1998).

Q760-Q769 on ISUP Signaling, Function and Procedure.

Q 764 (1999), Signaling System No. 7—ISDN User Part signaling procedures.

Q 730 (1999), ISDN User Part supplementary services.

Q 711 (1996), Functional description of signaling connection control part.

Q 712 (1996), Definition and function of signaling connection control part messages.

Q713 (1996), Signaling connection control part formats and codes.

Q 714 (1996), Signal connection control part procedures.

Q 716 (1993), Signaling Connection Control Part (SCCP) performance.

GSM 340 on SMS Digital cellular telecommunications system (Phase 2+); Technical realization of the Short Message Service (SMS); (GSM 03.40 version 7.4.0 Release 1998).

SMPP Forum: SMPP Protocol Document Version: Oct. 12, 1999 Issue 1.2.

GSM 379 on CAMEL Digital cellular telecommunications system (Phase 2+); Customized Applications for Mobile network Enhanced Logic (CAMEL); CAMEL Application Part (CAP) specification (GSM 09.78 version 7.1.0 Release 1998).

Technical Specification $3^{rd}$ Generation Partnership Project; Technical Specification Group Services and System Aspects; Service accessibility (Release 1999).

Signaling procedure and the Mobile Application Part (MAP) (Release 1999).

GMS 408 on radio interface layer 3; Digital cellular telecommunications system (Phase 2+); Mobile radio interface layer 3 specification (GSM 04.08 version 7.4.2 Release 1998).

GSM 322 network selection Digital cellular telecommunications system (Phase 2+); functions related to Mobile Station (MS) in idle mode and group receive mode (GSM 03.22 version 8.3.0 Release 1999).

GSM 23122 network selection 3GPP TS 23.122 V3.9.0 (Dec. 2002) Technical Specification; $3^{rd}$ Generation Partnership Project; Technical Specification Group Core Network; NAS Functions related to Mobile Station (MS) in idle mode (release 1999).

GSM 22011 service accessibility; 3 GPP TS 22.011 V3.8.0 (Sep. 2002) Technical Specification; $3^{rd}$ Generation Partnership Project; Technical Specification Group Services and System Aspects; Service accessibility (Release 1999).

3 GPP 29010; 3 GPP TS 29.010 V3.10.0 (Dec. 2002); Technical Specification; $3^{rd}$ Generation Partnership Project; Technical Specification Group Core Network; Information element mapping between Mobile Station—Base Station System (MS-BSS) and Base Station System—Mobile-services Switching Centre (BSS- MSC).

GSM 318 on CAMEL Basic Call Handling; Digital cellular telecommunications system (Phase 2+) Basic call handling; Technical realization (GSM 03.18 version 6.6.0 Release 1997).

ITU-T Recommendation Q. 766 (1993), Performance objectives in the integrated services digital network application.

ITU-T Recommendation Q. 765 (1998), Signaling system No. 7—Application transport mechanism.

ITU-T Recommendation Q. 769.1 (1999), Signaling system No. 7—ISDN user part enhancements for the support of Number Portability .

3G TS 22.078 version 3.2.0 Release 1999 UMTS CAMEL.

* cited by examiner

INBOUND ROAMER CALL CONTROL SYSTEM

CROSS-REFERENCE TO RELATED APPLICATIONS

This application is continuation of U.S. patent application Ser. No. 11/366,021 titled "Inbound Roamer Call Control System" filed Mar. 2, 2006, which claims the benefit of priority from U.S. Provisional Patent Application No. 60/658,258 titled "Dynamic CAMEL approach for Implementing Call Control Services for Inbound Roamers" filed Mar. 2, 2005. Each of these applications is incorporated in its entirety by reference herein.

BACKGROUND OF THE INVENTION

1. Field of the Invention

The present invention generally relates to inbound roamers. More specifically, the invention relates to value added call control services for inbound roamers.

2. Background of the Technology

Mobile communication systems are used worldwide. Hence, various operators offer international roaming to their users. An operator is specifically interested in inbound roaming revenues where users from a foreign operator visit the operator's network. To increase inbound roaming revenue, many operators offer various value added call control services to the inbound roamers.

Some of the value added services are roaming home short-code, optimal routing and misdialed digit correction. In the roaming home short-code service, an inbound roamer dials a home network short-code, such as, customer care or emergency at a visiting network. This service then translates the short-code into the home or visiting long number. The optimal routing service allows a local or another inbound roamer in the same visiting network to call an inbound roamer. The call can be directed via a local trunk route instead of an international trunk route. And, in case an inbound roamer misdials a number due to a wrong or missing international dialing prefix, the call can be intelligently corrected using the misdialed digits correction service.

Various techniques are available to implement one or more of the above services. One such technique uses an Integrated Services Digital Network User Part (ISUP) based node. In an example of this technique, a voice trunk equipped with service node is used. In another example, an ISUP loop-back at originating Mobile Switching Centre (MSC) is used to route an inbound roamer's calls through the service node, optimally applying various call service logics. In both the cases, circuit resources are heavily utilized, and switches may not be able to provide finer control of dialing digits analysis. Further, the ISUP signaling does not have International Mobile Subscriber Identity (IMSI) of the calling inbound roamer, hence the service node is unable to generate the Call Detail Records (CDR) for that inbound roamer. The IMSI can be found from a Home Public Mobile Network's (HPMN) Home Location Register (HLR) by using Mobile Application Part (MAP) signaling on Mobile Subscriber ISDN (MSISDN) of the calling inbound roamer. In another technique, Mobile Application Part Send Routing Information (MAP SRI) signaling is used to implement one or more of the call control services. In this case, a switch may be configured to issue MAP SRI on certain selected numbers for inbound roamers. When the MAP SRI signaling reaches the service node, the service node applies various application logics and returns a number back to the switch. The MAP signaling approach does not have equivalent resource utilization as the ISUP signaling. However, it is limited by the application logic and billing as it does not present the calling party number or IMSI of the inbound roamer or duration of the call.

In another technique, MAP SRI signaling is combined with ISUP signaling. For example, the switch first sends MAP SRI signaling on the called number to the service node. The service node then checks the called number to determine whether the application logic is applicable. If it is not, the service node will return the original number. However, if applicable, the service node returns a prefixed called number so the switch can subsequently route the call to the service node via the ISUP signaling. This hybrid approach reduces ISUP signaling resource utilization. However, it is disadvantageous, since the MAP SRI signaling does not have the calling party, and ISUP party does not have the IMSI of the calling party.

In yet another technique Intelligent Network (IN) signaling is used to implement call control services for inbound roamers. The switch is configured to initiate IN messages on the called number to the service node. Thereafter, the service node applies various application logics to interact with the switch. While, the IN approach does not heavily utilize the circuit resources and can generate billing for the call control services, it is switch dependent. Some switches might present the IMSI of the calling party. Some switches support certain IN functions allowing billing to be generated at the switch. This eliminates the need to generate billing at the service node. However, the IN approach is disadvantageous because the operators often have not paid license of the switch dependent IN specification for deploying the IN applications other than those from the switch vendor.

Thus there is a need for an alternative standard based approach that is cost-effective and utilizes minimum circuit resources. Further, it is desirable that the service node operates in a switch independent environment, perform various kinds of application logics and interact with the switch using MSISDN of the calling party without requiring the IMSI of the inbound roamer.

DESCRIPTION OF THE DRAWINGS

Brief Description of Drawings

In the drawings, the same or similar reference numbers identify similar elements or acts.

DETAILED DESCRIPTION

A method for implementing call control services for an inbound roamer is provided. The method includes receiving a routing request for a called number at a service node. The called number is present in a call from the inbound roamer. The method further includes sending a Terminating Customized Applications for Mobile network Enhanced Logic Subscription Information (T-CSI) for the called number by the service node to a switching center. The T-CSI contains an address pointing to a control node. Further, the method includes passing control of the call to the control node to implement the call control services for the inbound roamer.

A system for implementing call control services for an inbound roamer is also provided. The system includes a control node to implement the call control services in response to an initiation request. The system further includes a service node for sending a Terminating Customized Applications for Mobile network Enhanced Logic Subscription Information (T-CSI) for a called number in response to a routing request for the called number. The T-CSI contains an address pointing to the control node. The routing request for the called number and the initiation request are sent by a switching center, which receives a call from the inbound roamer.

The following description provides specific details for a thorough understanding and an enabling description for various embodiments of the Inbound Roamer Call Control (IRCC) system. However, one skilled in the art will understand that the IRCC system may be practiced without these details. In other instances, well-known structures and functions have not been shown or described in detail to avoid unnecessarily obscuring the description of the embodiments of the IRCC System. The headings provided herein are for convenience only and do not affect the scope or meaning of the claimed invention.

Figure 1:
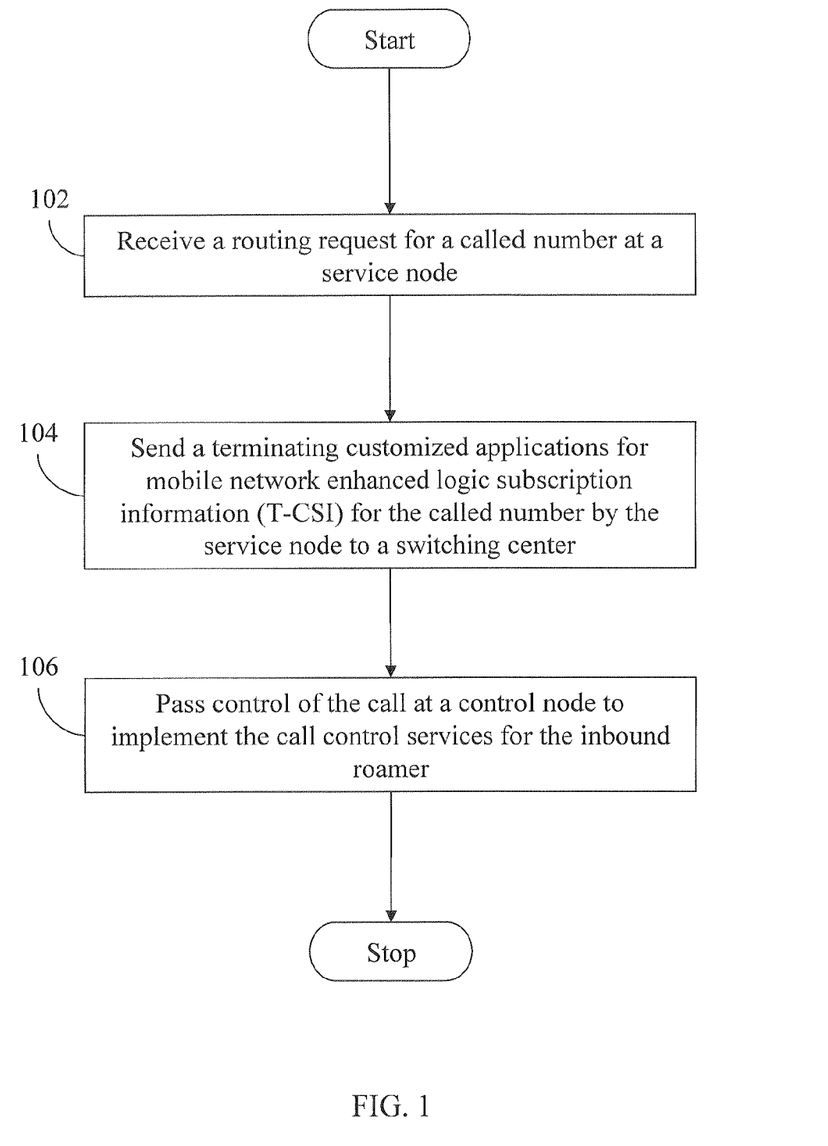
FIG. 1 represents a flowchart for a method for implementing call control services for an inbound roamer, in accordance with an embodiment of the invention.

FIG. 1 represents a flowchart for a method for implementing call control services for an inbound roamer, in accordance with an embodiment of the invention. At step 102, a service node receives a routing request for a called number. Prior to sending the routing request, a switching center receives a call from the inbound roamer for the called number. Thereafter, in accordance with one embodiment of the invention, the switching center is configured to send the routing request to the service node when the called number satisfies pre-determined criteria. In one embodiment of the invention, the routing request is a Send Routing Information (SRI) message for the called number sent by the switching center. In one embodiment of the invention, the switching center is a Global System for Mobile communication (GSM) Service Switching Function (SSF) node. The routing request sent is concurring to Mobile Application Part (MAP) protocol.

At step 104, the service node sends a Terminating Customized Applications for Mobile network Enhanced Logic Subscription Information (T-CSI) for the called number to the switching center. The T-CSI is sent in response to the routing request. In one embodiment of the invention, the service node is a Visited Public Land Mobile Network (VPLMN) Value Added Service (VAS) node. Since the T-CSI for any number is usually present with its Home Location Register (HLR), the VPLMN VAS node serves as a Virtual Home Location Register (V-HLR) of the called number. The T-CSI sent by the service node contains an address logically pointing to either the service node itself or a control node. In an embodiment of the invention, the control node is a Global System for Mobile communication (GSM) Service Switching Function (SCF) and may be integrated with the service node. The T-CSI also contains a service key that identifies an application, the control node uses depending on the called number. At step 106, control of the call is passed to the control node, which implements the call control services for the inbound roamer. The control of the call is passed to the control node when the control node receives an Initial Detection Point (IDP) in the initiation request from the switching center. Detection Point (DP) is point in the call at which and event in a Basic Call State Model (BCSM) is detected. The DP can be configured in order to notify the control node (or the GSM SCF) that the DP was encountered, and potentially to allow the control node to influence subsequent handling (or control) of the call. The switching center (or the GSM SSF) generates the IDP when a trigger is detected at the DP in the BCSM, to request instructions from the control node (or the GSM SCF). Along with the IDP the control node also receives the inbound roamer's number, the called number and an IMSI associated with the called number. In one embodiment of the invention, the service node sends the IMSI associated with the called number to the switching center (or the GSM SSF). The IMSI sent by the service node is a dummy IMSI for the called number and is sent only to comply with the standard protocol in use. The protocol used is a CAMEL protocol.

In one embodiment of the invention, one or more parameters are extracted from the IDP by the control node. For example, the parameters may be the service key, the called number, the inbound roamer's number, inbound roamer's category, location number, and address of GMSC/the switching center. In one embodiment of the invention, a tracking node monitors transactions of the inbound roamer between VPLMN and HPLMN to create a roamer database for the inbound roamer. The transactions are concurring to MAP protocol and occur across international roaming borders. The roamer database contains fields such as Mobile Subscriber ISDN Number (MSISDN), IMSI, Originating CAMEL Subscription Information (O-CSI), Call Forwarding Info, Call Barring Info, Operator Determined Barring (ODB), Supplementary Services (SS), Visited Mobile Switching Center (VMSC) and a Visiting Location Register (VLR) for the inbound roamer. The control node uses the fields from the roamer database together with the parameters extracted from the IDP to apply different logics and procedures in the applications to be used by the inbound roamer.

Figure 2:
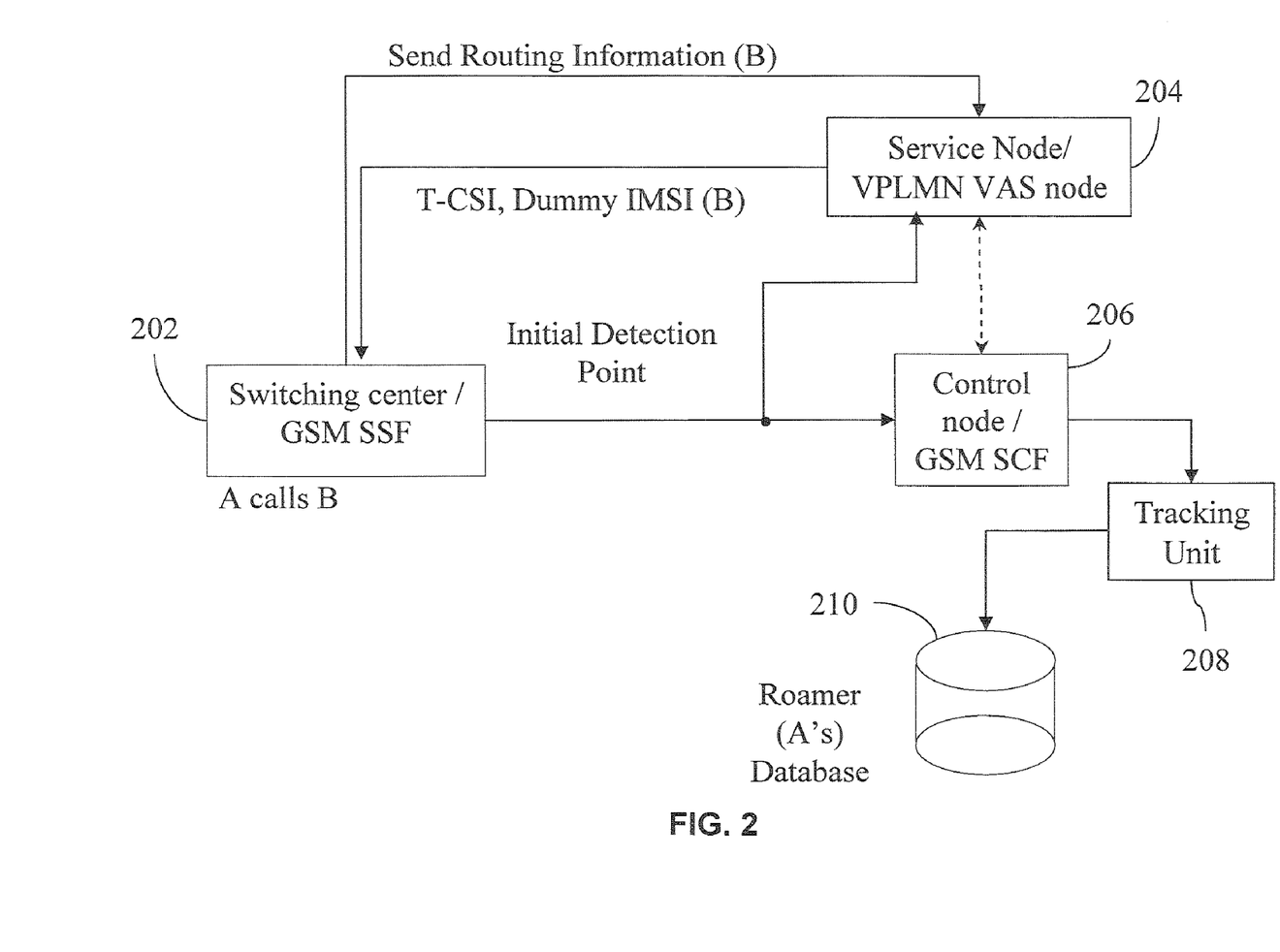
FIG. 2 represents a system for implementing call control services for an inbound roamer, in accordance with an embodiment of the invention.

FIG. 2 represents a system for implementing call control services for an inbound roamer, in accordance with an embodiment of the invention. The system includes a switching center 202, a service node 204, a control node 206 and a tracking unit 208. Switching center 202 receives a call from an inbound roamer for a called number. For example, switching center 202 receives a call from an inbound roamer number (A) dialing a called number (B). In one embodiment of the invention, switching center 202 is a Gateway Mobile Switching Center (GMSC). In another embodiment of the invention, switching center 202 is a Mobile Switching Center (MSC) of VPLMN. In yet another embodiment of the invention, switching center 202 is the GSM SSF. Switching center 202 is configured to send a routing request for the called number (B) to service node 204. This ensures that the call from the inbound roamer is not passed onto the HPLMN of the inbound roamer and the call routing is handled from the VPLMN itself. In one embodiment of the invention, the routing request is sent using a MAP SRI for the called number B. Service node 204, after receiving the routing request, sends a T-CSI for the called number (B) to switching center 202. In one embodiment of the invention, service node 204 is the VPMN VAS node and serves as the virtual HLR of the called number (B). The T-CSI includes a service key which identifies an application, control node 206 uses for the inbound roamer. Further, the T-CSI also contains an address pointing to either service node 204 or to control node 206. In an embodiment of the invention, control node 206 is a GSM SCF and may be integrated with service node 204.

In one embodiment of the invention, service node 204 also sends an IMSI for the called number (B). The IMSI sent by the service node is a dummy IMSI for the called number (B) and is sent only to comply with the standard CAMEL protocol in use. Switching center 202 on receiving the T-CSI and the address, issues the IDP to control node 206. Control node 206 extracts from the IDP one or more parameters, such as, the service key, the called number, the inbound roamer's number, inbound roamer's category, location number, and address of GMSC or the switching center. Further, control node 206 also receives the IMSI for the called number (B). Tracking unit 208 monitors transactions of the inbound roamer between VPLMN and HPLMN to create a roamer database 210 for the inbound roamer. The transactions are concurring to MAP protocol and occur across international roaming borders. In one embodiment of the invention, the roamer database 210 can contain fields such as MSISDN, IMSI, O-CSI, Call Forwarding Info, Call Barring Info, ODB, SS service, VMSC/VLR for the inbound roamer A. In yet another embodiment of the invention, control node 206 uses the IMSI for the inbound roamer A to generate billing information for the call made from A to B. Further, the fields from the roamer database 210, together with the parameters extracted from the IDP, are used by control node 206 to apply different logics and procedures for various applications for the inbound roamer. In one embodiment of the invention, the applications are value added services used by the inbound roamer A.

Figure 3:
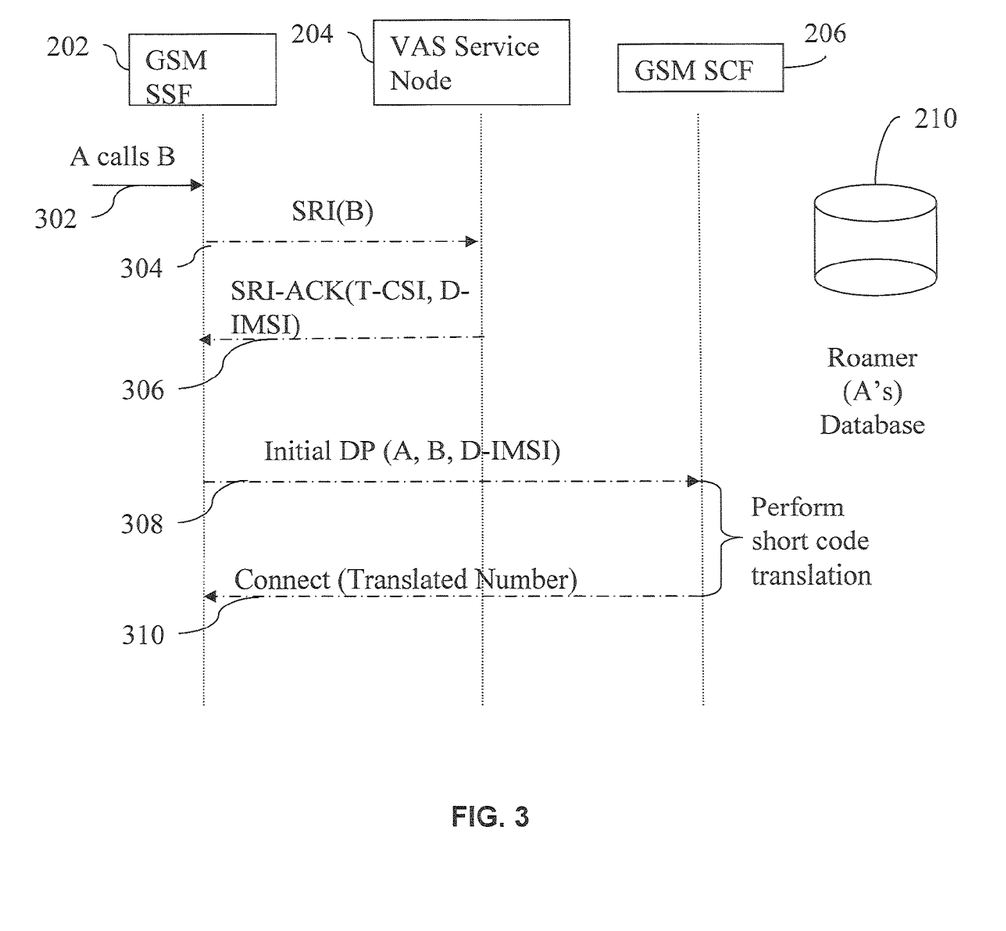
FIG. 3 represents a call flow for implementing short-code translation for an inbound roamer, in accordance with an embodiment of the invention.

FIG. 3 represents a call flow for implementing short-code translation for an inbound roamer, in accordance with an embodiment of the invention. At step 302, switching center 202 receives a call from the inbound roamer (A) dialing the called number (B). Switching center 202 checks the called number for pre-determined criteria. The pre-determined criteria are specific for the type of application used by the inbound roamer. For example, in this case, when the inbound roamer uses the short-code translation as the value added service, the pre-determined criteria includes checking whether length of the dialed digits is less or equal to a pre-defined value. Further, a check is also performed on whether the prefix of the called number is not a local number prefix and is not an international number. Once all the criteria are satisfied, at step 304, switching center 202 sends a SRI for B to service node 204. At step 306, service node 204 sends GT-CSI and an IMSI associated with the called number (B) to switching center 202. The T-CSI includes the service key and the address of control node 206.

At step 308, switching center 202 sends the IDP along with A, B and IMSI (B) to control node 206. Control node 206 checks whether Mobile Country Code or Mobile Network Code (MCC/MNC) of the inbound roamer is blacklisted by checking against a database. In the event, the inbound roamer is blacklisted, control node 206 sends a 'Continue' message to switching center 202 for normal routing of the call. The Continue message is a standard CAMEL protocol message used to signal the switching center to route the call normally. The call may be dropped in case the call is not routable. If the inbound roamer is not blacklisted, control node 206 checks whether the called number is a short-code of the MCC of the IMSI of the inbound roamer such that there exists a long-code translation in a short-code translation table for the MCC of the inbound roamer. However, if the called number is not a short-code, then control node 206 issues the Continue message to switching center 202 for normal routing of the call. In case the dialed number is a short-code, then at step 310, control node 206 issues a translated long-number corresponding to the short-code. In some cases, the long-number is a local number. Further, if the inbound roamer requires billing, control node 206 issues a Request Report Basic Call State Machine (RRB) to switching center 202 on notification mode on tAnswer and then tDisconnect event before issuing the long-number. Switching center 202 thereafter sends an Event Report Basic Call State Machine (ERB) to report on the tAnswer and the tDisconnect to control node 206, which are then used for generating billing information.

Figure 4:
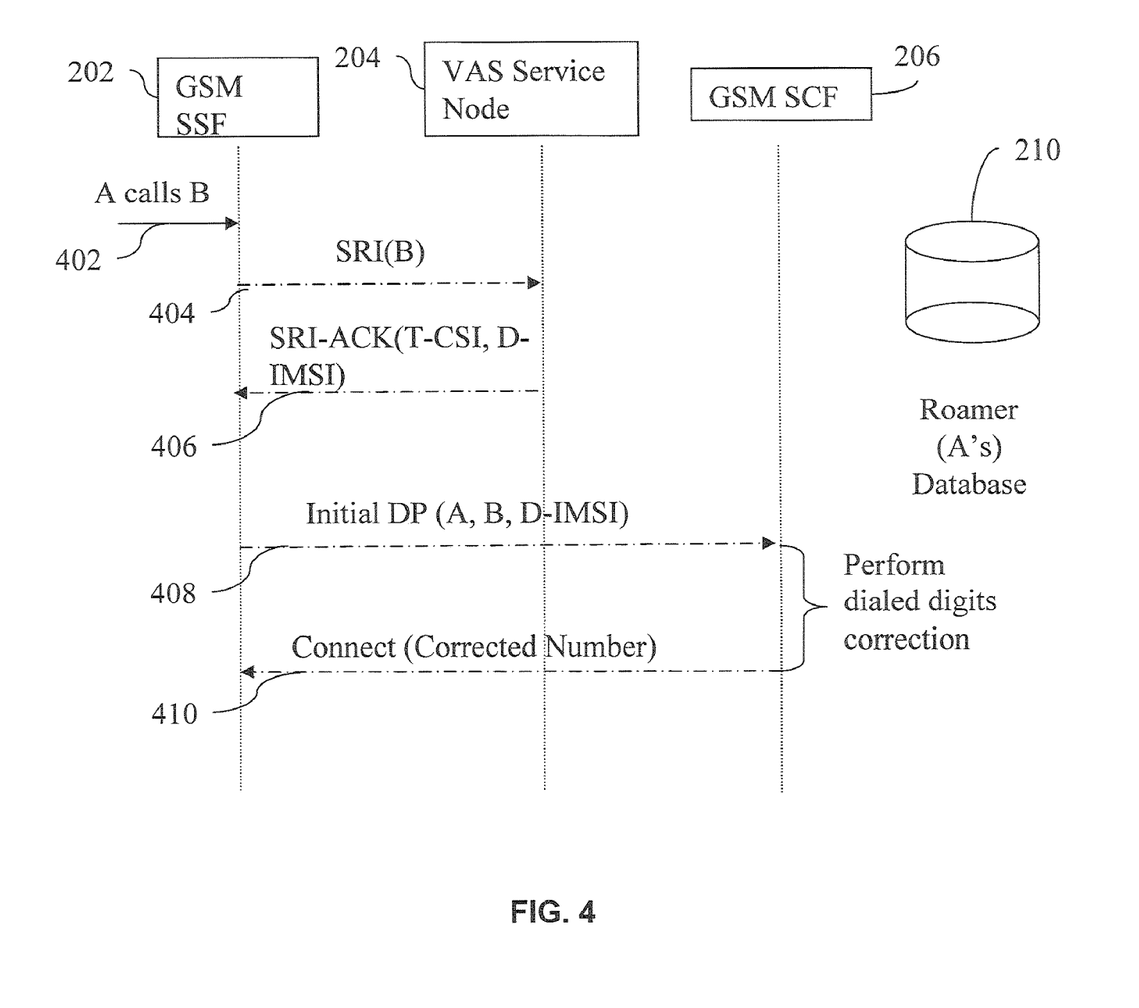
FIG. 4 represents a call flow for implementing misdialed digits correction for an inbound roamer, in accordance with an embodiment of the invention.

FIG. 4 represents a call flow for implementing misdialed digits correction for an inbound roamer, in accordance with an embodiment of the invention. At step 402, switching center 202 receives a call from the inbound roamer (A) dialing the called number B. Switching center 202 checks the called number for pre-determined criteria. This includes checking whether length of the dialed digits is greater than a pre-defined value. Further, switching center 202 checks prefix of the called number (B) whether it is equal to a wrong international dialing prefix of a non-VPLMN country. Switching center 202 checks whether the prefix of the called number is a local number prefix and is not an international number. At step 404, switching center 202 sends a SRI for B to service node 204. At step 406, service node 204 sends a T-CSI and an IMSI associated with the called number (B) to switching center 202. The T-CSI includes the service key and the address of control node 206.

At step 408, switching center 202 sends the IDP along with A, B and IMSI (B) to control node 206. Control node 206 checks whether the MCC/MNC of the inbound roamer is blacklisted. If, the inbound roamer is blacklisted, control node 206 sends a Continue message to switching center 202 for normal routing of the call. If the inbound roamer is not blacklisted, control node 206 checks whether the called number can be corrected with a numbering plan of HPLMN including its national prefix and international prefix and the numbering plan of VPLMN, including its national and international dialing prefix. However, if the called number cannot be corrected, control node 206 issues the Continue message to switching center 202 for normal routing of the call. In case there is a corrected number for the called number, then at step 410, control node 206 issues a corrected-number corresponding to the called number. In some cases, the corrected number is a routing number where the inbound roamer information such as caller identification ID is routed to for Caller Line Identification (CLI) guarantee. Further, if the inbound roamer requires billing, control node 206 issues a RRB to switching center 202 on notification mode on tAnswer and then tDisconnect event before issuing the corrected number. Switching center 202 thereafter sends an Event Report Basic Call State Machine (ERB) to report on the tAnswer and the tDisconnect to control node 206, which are then used for generating billing information.

Figure 5:
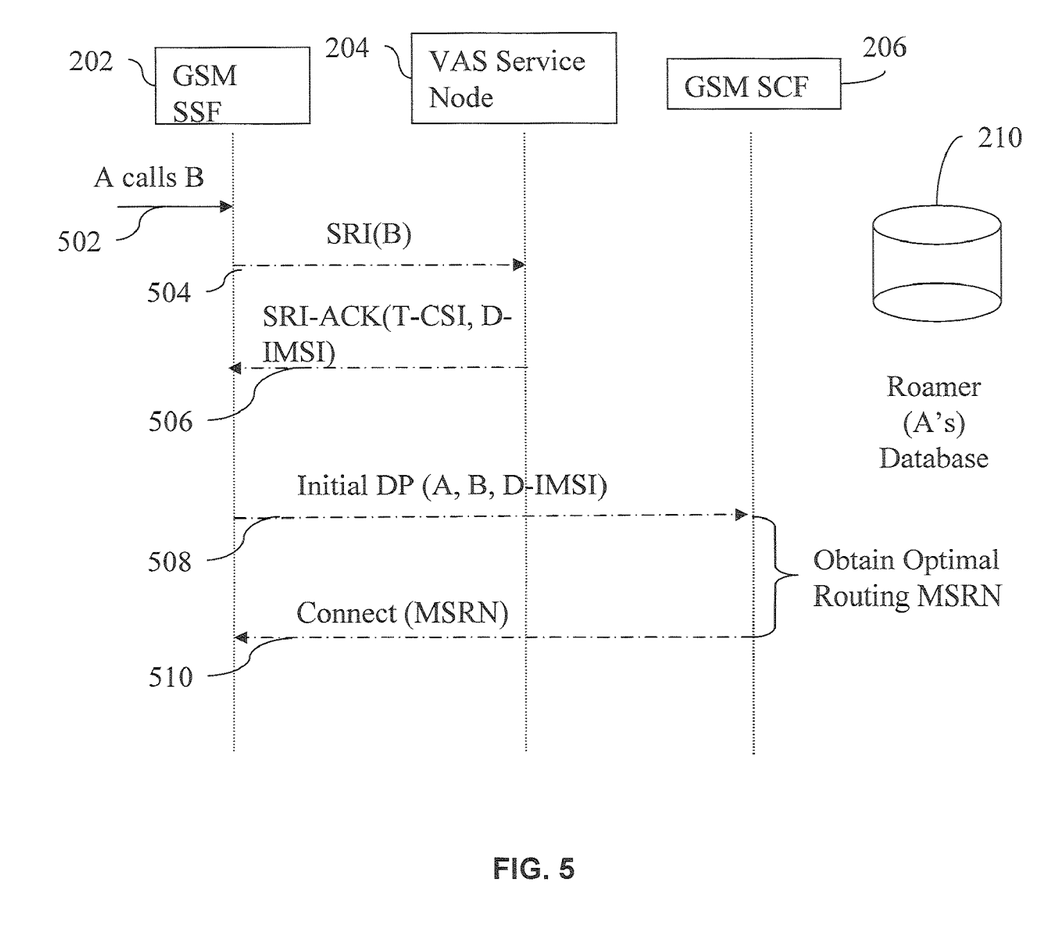
FIG. 5 represents a call flow for implementing optimum routing for an inbound roamer, in accordance with an embodiment of the invention.

FIG. 5 represents a call flow for implementing optimum routing for an inbound roamer, in accordance with an embodiment of the invention. At step 502, switching center 202 receives a call from an inbound roamer (A) calling for the called number B. Switching center 202 checks the called number (B) for pre-determined criteria. This includes checking whether the called number is prefixed with a special prefix, such as #0. Further, switching center 202 checks whether the prefix of the called number belongs to belong to some country code national dialing code (CC NDC) list and the dialed digits are an international number. Switching center 202 checks whether the called number is equal to an international number. At step 504, switching center 202 sends a SRI for B to service node 204. At step 506, service node 204 sends the T-CSI and an IMSI associated with the called number (B) to switching center 202. The T-CSI includes the service key and the address of control node 206.

At step 508, switching center 202 sends the IDP along with A, B and IMSI (B) to control node 206. Control node 206 checks whether the MCC/MNC of the inbound roamer is blacklisted. If the inbound roamer is blacklisted, control node 206 sends a Continue message to switching center 202 for normal routing of the call. If the inbound roamer is not blacklisted, control node 206 checks whether the called number is present in the roamer database 210. However, in case the called number is not present or the called international number does not satisfy the conditions of optimal routing, control node 206 issues the Continue message to switching center 202 for normal routing of the call. Otherwise, at step 510, control node 206 issues a mobile application part provide roaming number (MAP PRN) to the inbound roamer VLR, which in turn returns the mobile station roaming number (MSRN) to control node 206. Further, if the inbound roamer requires billing, control node 206 issues the RRB to switching center 202 on notification mode on tAnswer and then tDisconnect event before issuing the MSRN. Switching center 202 thereafter sends an Event Report Basic Call State Machine (ERB) to report on the tAnswer and the tDisconnect to control node 206, which are then used for generating billing information.

Figure 6:
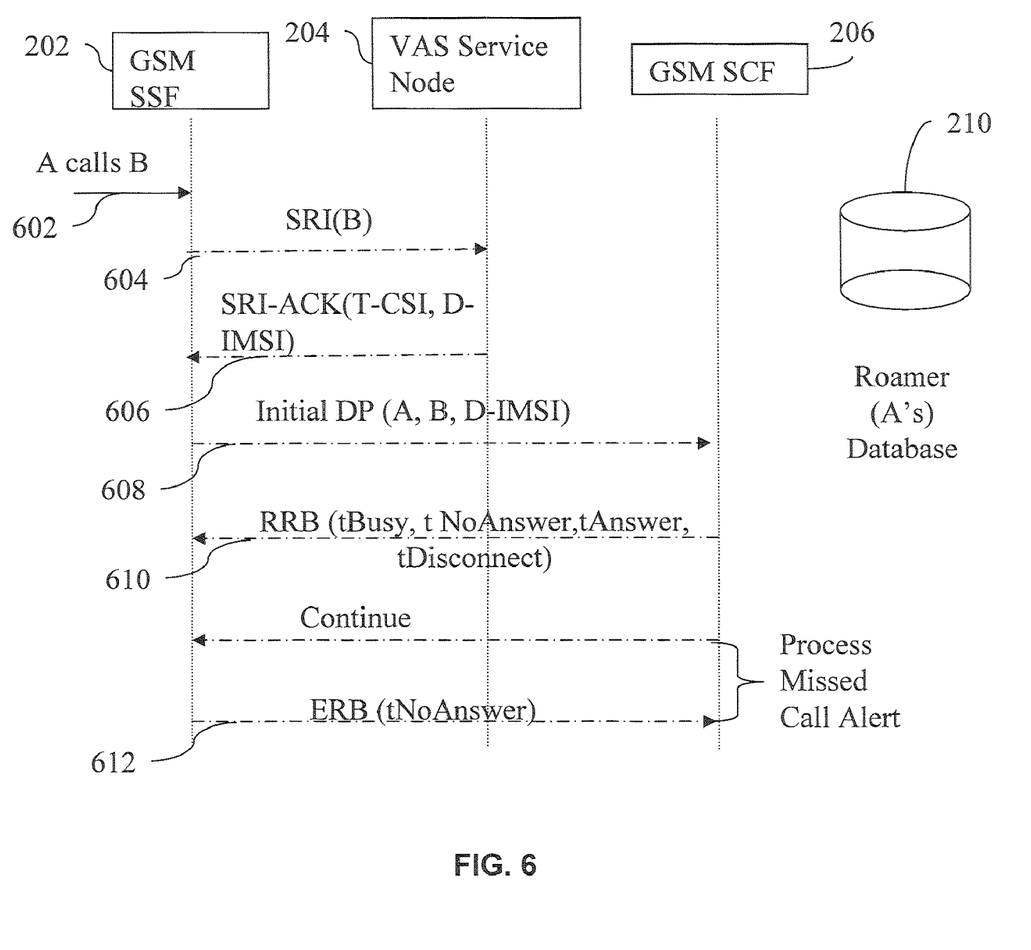
FIG. 6 represents a call flow for implementing missed call alert for an inbound roamer, in accordance with an embodiment of the invention.

FIG. 6 represents a call flow for implementing missed call alert for an inbound roamer, in accordance with an embodiment of the invention. At step 602, switching center 202 receives a call from an inbound roamer A calling for a called number B. Switching center 202 checks the called number for pre-determined criteria. Switching center 202 checks whether the called number is a VPLMN subscriber number. Further, switching center 202 checks whether the prefix of the called number belongs to belong to the CC NDC list and the dialed digits are an international number. At step 604, switching center 202 sends a SRI for B to service node 204. At step 606, service node 204 sends a T-CSI and an IMSI associated with the called number to switching center 202. The T-CSI includes the service key and the address of control node 206.

At step 608, switching center 202 sends the IDP along with A. B and IMSI (B) to control node 206. Control node 206 checks whether the MCC/MNC of the inbound roamer is blacklisted. In case, the inbound roamer is blacklisted then control node 206 sends a Continue message to switching center 202 for normal routing of the call. While, in case the inbound roamer is not blacklisted, then at step 610, control node 206 issues an RRB to switching center 202 on notification mode on tBusy, tNoAnswer, tAnswer and then tDisconnected event. Control node 206 also issues the Continue to the switching center. Switching center 202 thereafter at step 612 sends an Event Report Basic Call State Machine (ERB) to report on the tBusy, tNoAnswer, tAnswer and tCconnected events. Control node 206 then decides to either send a missed call alert to the called number and/or to the calling inbound roamer when the called number is available again.

Figure 7:
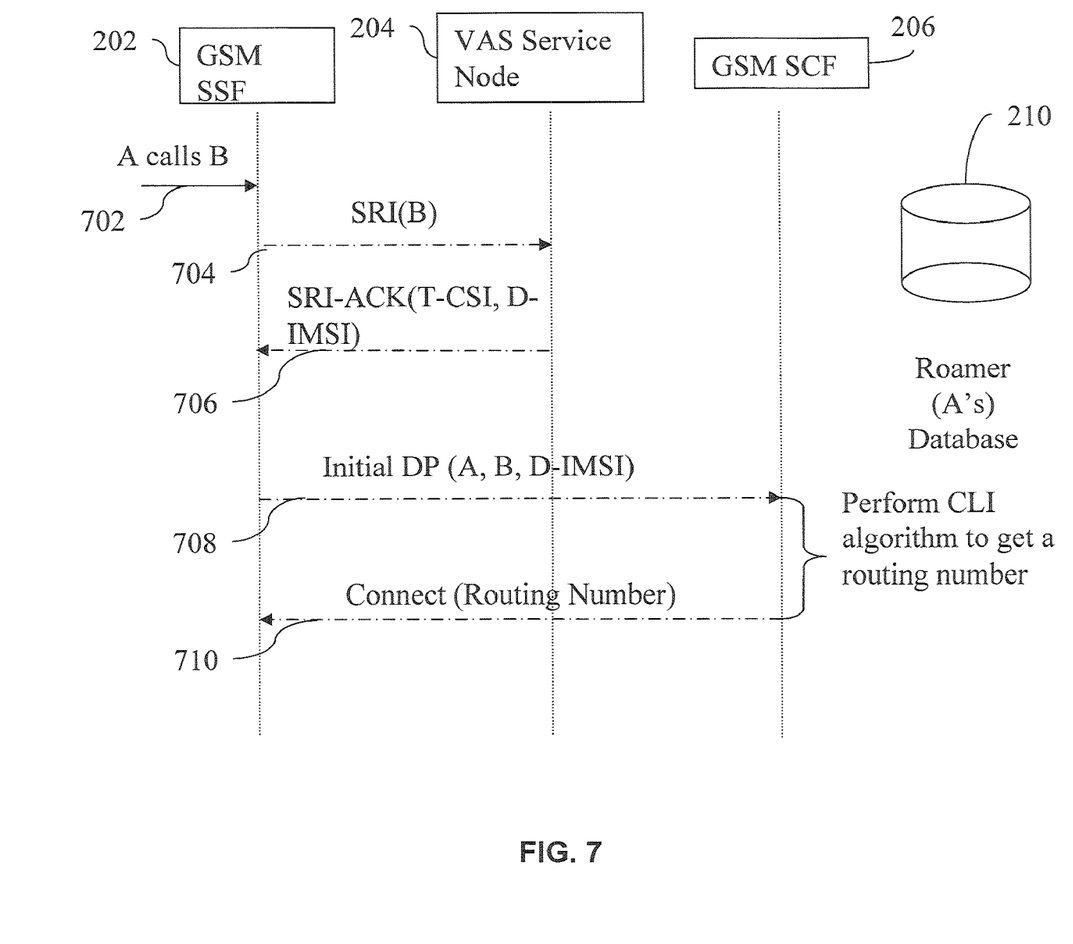
FIG. 7 represents a call flow for implementing caller line identification for an inbound roamer, in accordance with an embodiment of the invention.

FIG. 7 represents a call flow for implementing caller line identification for an inbound roamer, in accordance with an embodiment of the invention. At step 702, switching center 202 receives a call from an inbound roamer A calling for a called number B. Switching center 202 checks the called number for pre-determined criteria. This includes checking whether the called number is international number. Further, switching center 202 checks whether the prefix of the called number belongs to belong to some CC NDC list and the dialed digits are an international number. At step 704, switching center 202 sends a SRI for B to service node 204. At step 706, service node 204 sends a T-CSI and an IMSI associated with the called number to switching center 202. The T-CSI includes the service key and the address of control node 206.

At step 708, switching center 202 sends the IDP along with A, B and IMSI (B) to control node 206. Control node 206 checks whether the MCC/MNC of the inbound roamer is blacklisted. If the inbound roamer is blacklisted, control node 206 sends a Continue message to switching center 202 for normal routing of the call. If the inbound roamer is not blacklisted, control node 206 applies a CLI algorithm to obtain a routing number. Thereafter, control node 206 at step 710, issues a routing number to switching center 202. Further, if the inbound roamer requires billing, control node 206 issues the RRB to switching center 202 on notification mode on tAnswer and then tDisconnect event before issuing the routing number. Switching center 202 thereafter sends the tAnswer and the tDisconnect, which are then used for billing.

A computer usable medium provided herein includes computer usable program code, which when executed implements call control services for the inbound roamers by receiving a routing request for a called number at a service node. The called number is present in a call from the inbound roamer. The computer usable medium further includes computer usable program code for sending a terminating customized applications for mobile network enhanced logic subscription information (T-CSI) for the called number by the service node to a switching center. The T-CSI contains an address pointing to a control node. The computer usable medium further includes computer usable program code for passing control of the call to the control node to implement the call control services for the inbound roamer.

The components of Inbound Roaming Call Control System (IRCCS) described above include any combination of computing components and devices operating together. The components of the IRCCS can also be components or subsystems within a larger computer system or network. The IRCCS components can also be coupled with any number of other components (not shown), for example other buses, controllers, memory devices, and data input/output devices, in any number of combinations. In addition any number or combination of other processor based components may be carrying out the functions of the IRCCS.

It should be noted that the various components disclosed herein may be described using computer aided design tools and/or expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the IRCCS is not intended to be exhaustive or to limit the IRCCS to the precise form disclosed. While specific embodiments of, and examples for, the IRCCS are described herein for illustrative purposes, various equivalent modifications are possible within the scope of the IRCCS, as those skilled in the art will recognize. The teachings of the IRCCS provided herein can be applied to other processing systems and methods. They may not be limited to the systems and methods described above.

The elements and acts of the various embodiments described above can be combined to provide further embodiments. These and other changes can be made to the IRCCS in light of the above detailed description.

Other Variations

Provided above for the edification of those of ordinary skill in the art, and not as a limitation on the scope of the invention, are detailed illustrations of a scheme for implementing call control services for the inbound roamers. Numerous variations and modifications within the spirit of the present invention will of course occur to those of ordinary skill in the art in view of the embodiments that have been disclosed. For example the present invention is implemented primarily from the point of view of GSM mobile networks as described in the embodiments. However, notwithstanding, the present invention may also be effectively implemented on CDMA, 3G, WCDMA, GPRS, etc., or any other network of common carrier telecommunications in which end users are normally configured to operate within a "home" network to which they normally subscribe, but have the capability of also operating on other neighboring networks, which may even be across international borders.

The examples under the present invention Inbound Roamer Call Control System (IRCCS), detailed in the illustrative examples contained herein are described using terms and constructs drawn largely from GSM mobile telephony infrastructure. But use of these examples should not be interpreted to limiting the invention to those media. Inbound Roamer Call Control System—a method for implementing call control services for an inbound roamer in a manner that is agnostic to the capabilities of the visited or non-accustomed network can be of use and provided through any type of telecommunications medium, including without limitation: (i) any mobile telephony network including without limitation GSM, 3GSM, 3G, CDMA, WCDMA or GPRS, satellite phones or other mobile telephone networks or systems; (ii) any so-called WiFi apparatus normally used in a home or subscribed network, but also configured for use on a visited or non-home or non-accustomed network, including apparatus not dedicated to telecommunications such as personal computers, Palm-type or Windows Mobile devices,; (iii) an entertainment console platform such as Sony Playstation, PSP or other apparatus that are capable of sending and receiving telecommunications over home or non-home networks, or even (iv) fixed-line devices made for receiving communications, but capable of deployment in numerous locations while preserving a persistent subscriber id such as the eye2eye devices from Dlink; or telecommunications equipment meant for voice over IP communications such as those provided by Vonage or Packet8.

In describing certain embodiments of the IRCCS under the present invention, this specification follows the path of a telecommunications call from a calling party to a called party. For the avoidance of doubt, that call can be for a normal voice call, in which the subscriber telecommunications equipment is also capable of visual, audiovisual or motion-picture display. Alternatively, those devices or calls can be for text, video, pictures or other communicated data.

TECHNICAL REFERENCES

GSM 902 on MAP specification
Digital cellular telecommunications system (Phase 2+)
Mobile Application Part (MAP) Specification
(3GPP TS 09.02 version 7.9.0 Release 1998)
GSM 340 on SMS
Digital cellular telecommunications system (Phase 2+)
Technical realization of the Short Message Service (SMS)
(GSM 03.40 version 7.4.0 Release 1998)
GSM 378 on CAMEL
Digital cellular telecommunications system (Phase 2+)
Customised Applications for Mobile network Enhanced Logic (CAMEL) Phase 2
Stage 2
(GSM 03.78 version 6.7.0 Release 1997)
GSM 978 on CAMEL Application protocol
Digital cellular telecommunications system (Phase 2+)
Customised Applications for Mobile network Enhanced Logic (CAMEL)
CAMEL Application Part (CAP) specification
(GSM 09.78 version 7.1.0 Release 1998)
GSM 379 on CAMEL Support of Optimal Routing (SOR)
Digital cellular telecommunications system (Phase 2+)
Support of Optimal Routing (SOR)
Technical realization
(GSM 03.79 version 7.3.0 Release 1998)
GSM 318 on CAMEL Basic Call Handling
Digital cellular telecommunications system (Phase 2+)
Basic call handling
Technical realization
(GSM 03.18 version 6.6.0 Release 1997)
ITU-T Recommendation Q.1214 (1995), Distributed functional plane for intelligent network CS-1.
ITU-T Recommendation Q.1218 (1995), Interface Recommendation for intelligent network CS-1.
ITU-T Recommendation Q.730 (1999), ISDN user part supplementary services.
ITU-T Recommendation Q.762 (1999), Signaling system No. 7—ISDN user part general functions of messages and signals.
ITU-T Recommendation Q.763 (1999), Signaling system No. 7—ISDN user part formats and codes.
ITU-T Recommendation Q.764 (1999), Signaling system No. 7—ISDN user part signaling procedures.
ITU-T Recommendation Q.766 (1993), Performance objectives in the integrated services digital network application.
ITU-T Recommendation Q.765 (1998), Signaling system No. 7—Application transport mechanism.
ITU-T Recommendation Q.769.1 (1999), Signaling system No. 7—ISDN user part enhancements for the support of Number Portability.

APPENDIX

| Acronym | Description |
| --- | --- |
| 3G | Third generation of mobile |
| BSC | Base Station Controller |
| BCSM | Basic Call State Model |
| CAMEL | Customized Application for Mobile Enhanced Logic |
| CC | Country Code |
| CDMA | Code Division Multiplexed Access |
| CLI | Calling Line Identification |
| CAP | Camel Application Part |
| CSI | Camel Subscription Information |
| ERB | Event Report Basic Call State Machine |
| GMSC | Gateway MSC |
| GPRS | General Packet Radio System |
| GSM | Global System for Mobile |
| GSM SSF | GSM Service Switching Function |
| HLR | Home Location Register |
| HPLMN | Home Public Land Mobile Network |
| IMSI | International Mobile Subscriber Identity |
| IN | Intelligent Network |
| INAP | Intelligent Network Application Part |
| IDP | Initial DP IN/CAP message |
| ISUP | ISDN User Part |
| MAP | Mobile Application Part |
| MCC | Mobile Country Code |
| MCC | Mobile Country Code |
| MNC | Mobile Network Code |
| MO | Mobile Originated |
| MSC | Mobile Switching Center |
| MSISDN | Mobile Subscriber ISDN Number |
| MSRN | Mobile Subscriber Roaming Number |
| MT | Mobile Terminated |
| NDC | National Dialing Code |
| ODB | Operator Determined Barring |
| O-CSI | Originating CAMEL Subscription Information |
| PRN | Provide Roaming Number |
| RRB | Request Report Basic Call State Machine |
| SRI | Send Routing Information |
| SS | Supplementary Services |
| T-CSI | Terminating CAMEL Service Information |
| VAS | Value Added Service |
| VLR | Visited Location Register |
| VMSC | Visited Mobile Switching Center |
| VPLMN | Visited Public Land Mobile Network |

What is claimed is:

1. A system for implementing call control services for an inbound roamer, the system comprising:
  a control node to implement the call control services in response to an initiation request;
  a visited public land mobile network (VPLMN) value added service (VAS) node to send a terminating customized applications for mobile network enhanced logic subscription information (T-CSI) for a called number in response to a routing request for the called number, wherein the T-CSI contains an address pointing to the control node; and
  a switching center to send the routing request for the called number and the initiation request, wherein the called number is present in a call received from the inbound roamer and the called number satisfies pre-determined criteria.

2. The system of claim 1, wherein the switching center is one of a gateway mobile switching center (GMSC) and a mobile switching center (MSC) configured to send the routing request for the called number to the service node.

3. The system of claim 1, wherein the switching center is a global system for mobile communication service switching function (GSM SSF) configured to send the routing request for the called number to the service node.

4. The system of claim 1, wherein the service node sends an International Mobile Subscriber Identity (IMSI) associated with the called number to the switching center.

5. The system of claim 1, wherein the control node is a global system for mobile communication service control function (GSM SCF) for implementing the call control services for the inbound roamer.

6. The system of claim 1, wherein the control node is a global system for mobile communication service control function (GSM SCF) integrated with the service node for implementing the call control services for the inbound roamer.

7. The system of claim 1, wherein the T-CSI comprises a service key identifying an application to be used by the control node.

8. The system of claim 1, wherein the initiation request contains an initial detection point (IDP).

9. A computer program product comprising a non-transitory computer readable medium including a computer usable program code for implementing call control services for an inbound roamer, the computer program product comprising:
  computer usable program code for receiving a routing request for a called number at a visited public land mobile network (VPLMN) value added service (VAS) node, wherein the called number is present in a call from the inbound roamer and the called number satisfies pre-determined criteria;
  computer usable program code for sending a terminating customized applications for mobile network enhanced logic subscription information (T-CSI) for the called number by the VPLMN VAS node to a switching center, wherein the T-CSI contains an address pointing to a control node; and
  computer usable program code for passing control of the call to the control node to implement the call control services for the inbound roamer.

10. The computer program product of claim 9 further comprises computer usable program code for sending an International Mobile Subscriber Identity (IMSI) associated with the called number, wherein the IMSI is sent by the VPLMN VAS node.

11. The computer program product of claim 9 further comprises computer usable program code for configuring the switching center to send the routing request for the called number to the VPLMN VAS node when the called number satisfies the pre-determined criteria.

12. The computer program product of claim 9, wherein the call is received at the switching center, wherein the switching center is a Global System for Mobile communication Service Switching Function (GSM SSF) node.

13. The computer program product of claim 9 further comprises computer usable program code for using a service key included in the T-CSI to identify an application to be used by the control node.

14. The computer program product of claim 9, wherein passing the control of the call to the control node comprises sending an IDP for implementing the call control services for the inbound roamer by the switching center.

15. The computer program product of claim 9 further comprises computer usable program code for creating a roamer database for the inbound roamer by monitoring transactions of the inbound roamer between a visited public land mobile network visited location register (VPLMN VLR) and a home public land mobile network home location register (HPLMN HLR), wherein the transactions are concurring to a mobile application part (MAP) protocol.

16. The computer program product of claim 15, wherein the control node uses the roamer database to generate billing information for the call.

17. A method for implementing call control services for an inbound roamer, the method comprising:
- receiving a routing request for a called number at a visited public land mobile network (VPLMN) value added service (VAS) node, wherein the called number is present in a call from the inbound roamer and the called number satisfies pre-determined criteria;
- sending a terminating customized applications for mobile network enhanced logic subscription information (T-CSI) for the called number by the VPLMN VAS node to a switching center, wherein the T-CSI contains an address pointing to a control node; and
- passing control of the call to the control node to implement the call control services for the inbound roamer.

18. The method of claim 17 further comprises sending an International Mobile Subscriber Identity (IMSI) associated with the called number to the switching center, wherein the IMSI is sent by the VPLMN VAS node.

19. The method of claim 17 further comprises configuring the switching center to send the routing request for the called number to the VPLMN VAS node when the called number satisfies the pre-determined criteria.

20. The method of claim 17, wherein the call is received at the switching center, wherein the switching center is a Global System for Mobile communication Service Switching Function (GSM SSF) node.

21. The method of claim 17 further comprises using a service key included in the T-CSI to identify an application to be used by the control node.

22. The method of claim 17, wherein passing control of the call to the control node comprises sending an IDP for implementing the call control services for the inbound roamer by the switching center.

23. The method of claim 17 further comprises creating a roamer database for the inbound roamer by monitoring transactions of the inbound roamer between a visited public land mobile network visited location register (VPLMN VLR) and a home public land mobile network home location register (HPLMN HLR), wherein the transactions are concurring to a mobile application part (MAP) protocol.

24. The method of claim 23, wherein the control node uses the roamer database to generate billing information for the call.

25. The method of claim 17 further comprises issuing a Mobile Subscriber Roaming Number (MSRN) to the switching center for optimally routing the call from the inbound roamer, wherein the issuing is performed by the control node.

26. The method of claim 17, further comprising:
- issuing a routing number to the switching center, wherein the issuing is performed by the control node.

* * * * *